US008829979B2

(12) United States Patent
Galal et al.

(10) Patent No.: US 8,829,979 B2
(45) Date of Patent: Sep. 9, 2014

(54) POWER-EFFICIENT MULTI-MODE CHARGE PUMP

(75) Inventors: Sherif Galal, Irvine, CA (US); Tay Hui Zheng, Aliso Viejo, CA (US); Todd L. Brooks, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 110 days.

(21) Appl. No.: 12/807,610

(22) Filed: Sep. 8, 2010

(65) Prior Publication Data

US 2011/0204961 A1 Aug. 25, 2011

Related U.S. Application Data

(60) Provisional application No. 61/338,987, filed on Feb. 25, 2010.

(51) Int. Cl.
  *G05F 1/10* (2006.01)
  *G05F 3/02* (2006.01)

(52) U.S. Cl.
  USPC .......................................... 327/536

(58) Field of Classification Search
  USPC ...................... 327/536; 363/59–60
  See application file for complete search history.

(56) References Cited

U.S. PATENT DOCUMENTS

| 6,456,153 | B2 * | 9/2002 | Buck et al. | 327/536 |
| 6,693,483 | B2 * | 2/2004 | Deml et al. | 327/536 |
| 6,813,331 | B1 * | 11/2004 | Yu et al. | 377/69 |
| 7,286,072 | B2 * | 10/2007 | Sakata et al. | 341/155 |
| 7,714,763 | B2 * | 5/2010 | Kim et al. | 341/164 |
| 7,804,437 | B2 * | 9/2010 | Han et al. | 341/164 |
| 7,907,078 | B2 * | 3/2011 | Cheung | 341/162 |
| 2006/0244513 | A1 * | 11/2006 | Yen et al. | 327/536 |
| 2008/0150619 | A1 * | 6/2008 | Lesso et al. | 327/536 |
| 2008/0150620 | A1 * | 6/2008 | Lesso | 327/536 |
| 2009/0135041 | A1 * | 5/2009 | Han et al. | 341/172 |
| 2009/0219081 | A1 * | 9/2009 | Kwon et al. | 327/536 |

* cited by examiner

*Primary Examiner* — Quan Tra
(74) *Attorney, Agent, or Firm* — Oblon, Spivak, McClelland, Maier & Neustadt, L.L.P.

(57) ABSTRACT

Disclosed is a power-efficient multi-mode charge pump. The charge pump comprises a first pumping circuit that provides at least one output voltage produced by a discharge sequence of a shared flyback capacitor. The charge pump also comprises a second pumping circuit that provides a plurality of output voltages produced by a corresponding plurality of discharge sequences of the shared flyback capacitor. The charge pump may include a transition circuit to selectably enable the first pumping circuit or the second pumping circuit. In one embodiment, the first pumping circuit may employ a two-phase discharge sequence. In another embodiment, the second pumping circuit may employ a three-phase plurality of discharge sequences. A related method is also disclosed.

18 Claims, 5 Drawing Sheets

POWER-EFFICIENT MULTI-MODE CHARGE PUMP

The present application claims the benefit of and priority to a pending provisional patent application entitled "Power-Efficient Charge Pump, Charge Pump Regulation with Dynamic Turn-On Resistance Control, and Smooth Mode Transition for Dual Mode Charge Pump," Ser. No. 61/338,987 filed on Feb. 25, 2010. The disclosure in that pending provisional application is hereby incorporated fully by reference into the present application.

BACKGROUND OF THE INVENTION

1. Field of the Invention

The present invention generally relates to the field of electrical circuits, and more particularly to the field of voltage regulation circuits and charge pumps.

2. Background Art

Charge pumps can form an important part of many mobile communications devices, such as cellular telephones. For example, a mobile communications device without multiple supply rails may potentially use a charge pump to provide multiple supply voltage levels by selectively charging and discharging one or more capacitors. However, conventional charge pumps are not easily adaptable for use in many mobile communications devices.

Typically, conventional charge pumps are unable to generate the multiple voltage reference levels that are required by components such as Class-G amplifiers within many mobile communications devices. A Class-G amplifier driving an audio headset of a cellular telephone, for instance, may require multiple sets of supply voltages, which a single conventional charge pump is generally unable to provide. Moreover, conventional charge pumps using multiple flyback capacitors or switching regulators are often too inefficient or costly for many mobile communications devices. Many mobile communications devices may require a single charge pump that can generate multiple sets of reference voltages. Such a charge pump may also need to smoothly transition between these multiple reference voltages in a power-efficient and reliable manner.

Additionally, the fixed turn-on resistance of the switches used to charge or discharge capacitors in a conventional charge pump may limit the performance of a mobile communications device. At low load currents, a small fixed turn-on resistance that is required at high load currents may cause large output voltage variations, especially when a variable power source, such as a battery, supplies power. Conversely, at high load currents, a fixed turn-on resistance must be very small to maintain a stable output voltage. Unfortunately, a small fixed turn-on resistance may render a switch unreliable in the presence of large charge current from a high voltage power source.

Accordingly, there is a need to overcome the drawbacks and deficiencies in the art by providing a power-efficient multi-mode charge pump with dynamic turn-on resistance control and smooth mode transition, that is suitable for implementation in a mobile communications device, such as a cellular telephone.

SUMMARY OF THE INVENTION

The present application is directed to a power-efficient multi-mode charge pump, substantially as shown in and/or described in connection with at least one of the figures, as set forth more completely in the claims.

DETAILED DESCRIPTION OF THE INVENTION

The present invention is directed to a power-efficient multi-mode charge pump. Although the invention is described with respect to specific embodiments, the principles of the invention, as defined by the claims appended herein, can obviously be applied beyond the specifically described embodiments of the invention described herein. Moreover, in the description of the present invention, certain details have been left out in order not to obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings. It should be borne in mind that, unless noted otherwise, like or corresponding elements among the figures are indicated by like or corresponding reference numerals. Moreover, the drawings and illustrations in the present application are generally not to scale, and are not intended to correspond to actual relative dimensions.

Conventional charge pumps are not readily adaptable to many mobile communications devices. A Class-G amplifier, for example, may require more than two specific reference voltages. Conventional solutions that use multiple charge pumps to provide multiple sets of reference voltages disadvantageously require multiple costly flyback capacitors. Conventional solutions using switching regulators typically employ costly and bulky passive components such as inductors.

Moreover, during mode transition, when reducing the voltage across the flyback capacitor of a conventional charge pump, the flyback capacitor may leak charge back into the power supply. Such a leak can waste power and potentially damage the power supply. The small fixed on-resistance of the switches in a conventional charge pump may also cause large output variations at low load currents and instability when larger power supplies are used.

Figure 1:
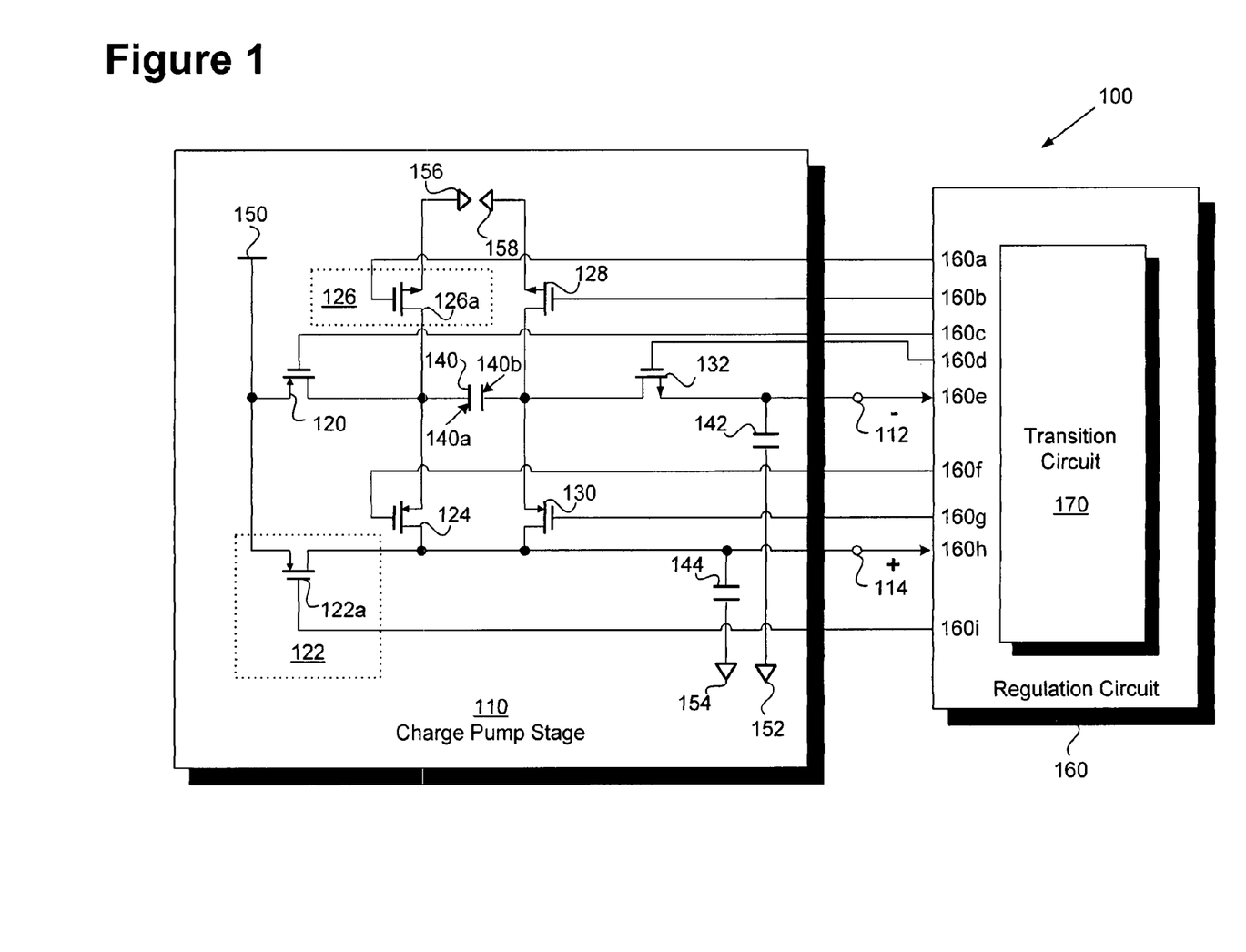
FIG. 1 shows a block diagram of a power efficient multi-mode charge pump, according to one embodiment of the present invention.

Given these critical problems of reliably providing multiple sets of reference voltages with a single charge pump, FIG. 1 shows multi-mode charge pump 100 in accordance with one embodiment of the present invention. Multi-mode charge pump 100 is power-efficient. Multi-mode charge pump may include charge pump stage 110 and regulation circuit 160.

Charge pump stage 110 may comprise negative holding capacitor 142, positive holding capacitor 144, and shared flyback capacitor 140 with first plate 140a and second plate 140b. Charge pump stage 110 may also include switches 120, 124, 128, 130, and 132, and switching groups 122 and 126. Switching group 122 may include a plurality of switches, such as switch 122a. Similarly, switching group 126 may include a plurality of switches such as switch 126a. Any of switches 120, 122a, 124, 126a, 128, 130, and 132 may be metal-oxide-semiconductor field-effect transistors (MOSFETs).

Charge pump stage 110 may include voltage source 150 coupled to a source terminal of switch 120. Charge pump 110 may also comprise ground terminal 152 coupled to a plate of negative holding capacitor 142, ground terminal 154 coupled to a plate of positive holding capacitor 144, ground terminal 156 coupled to the source terminals of the switches in switching group 126, and ground terminal 158 coupled to the source terminal of switch 128.

Charge pumping stage 110 may include a first pumping circuit, such as a full-voltage circuit that supports a full-voltage mode of multi-mode charge pump 100. Charge pumping stage 110 may also comprise a second pumping circuit, such as a half-voltage circuit that supports a half-voltage mode of multi-mode charge pump 100. A full-voltage circuit may enable switches 120, 128, and 132, as well as switching groups 122 and 126. The full-voltage circuit may disable switches 124 and 130. The full-voltage mode may provide at least one output voltage, including output voltages 112 and 114, which may have a magnitude substantially equal to the full supply voltage of voltage source 150.

A half-voltage circuit may enable switches 120, 124, 128, 130, and 132, and switching group 126. The half-voltage circuit may also disable switching group 122. The half-voltage mode may provide a plurality of output voltages, including output voltages 112 and 114 which may have a magnitude substantially equal to the half of the full supply voltage of voltage source 150.

Regulation circuit 160 may supply clocked control signals, such as control signals 160a, 160b, 160c, and 160d (hereinafter "control signals 160a-d"), 160f, 160g, and 160i. Control signals 160a-d, 160f, 160g, and 160i may switch the control terminals of respective switching group 126, switch 128, switch 120, switch 132, switch 124, switch 130, and switching group 122. Regulation circuit 160 may also monitor both the output voltage 112 at negative input terminal 160e, and the output voltage 114 at positive input terminal 160h. Regulation circuit 160 may also provide dynamic turn-on resistance control signals 160a and 160i. Control signals 160a and 160i may switch the control terminals of respective switching group 126 and switching group 122 as the function of the power source voltage and load currents.

Figure 2:
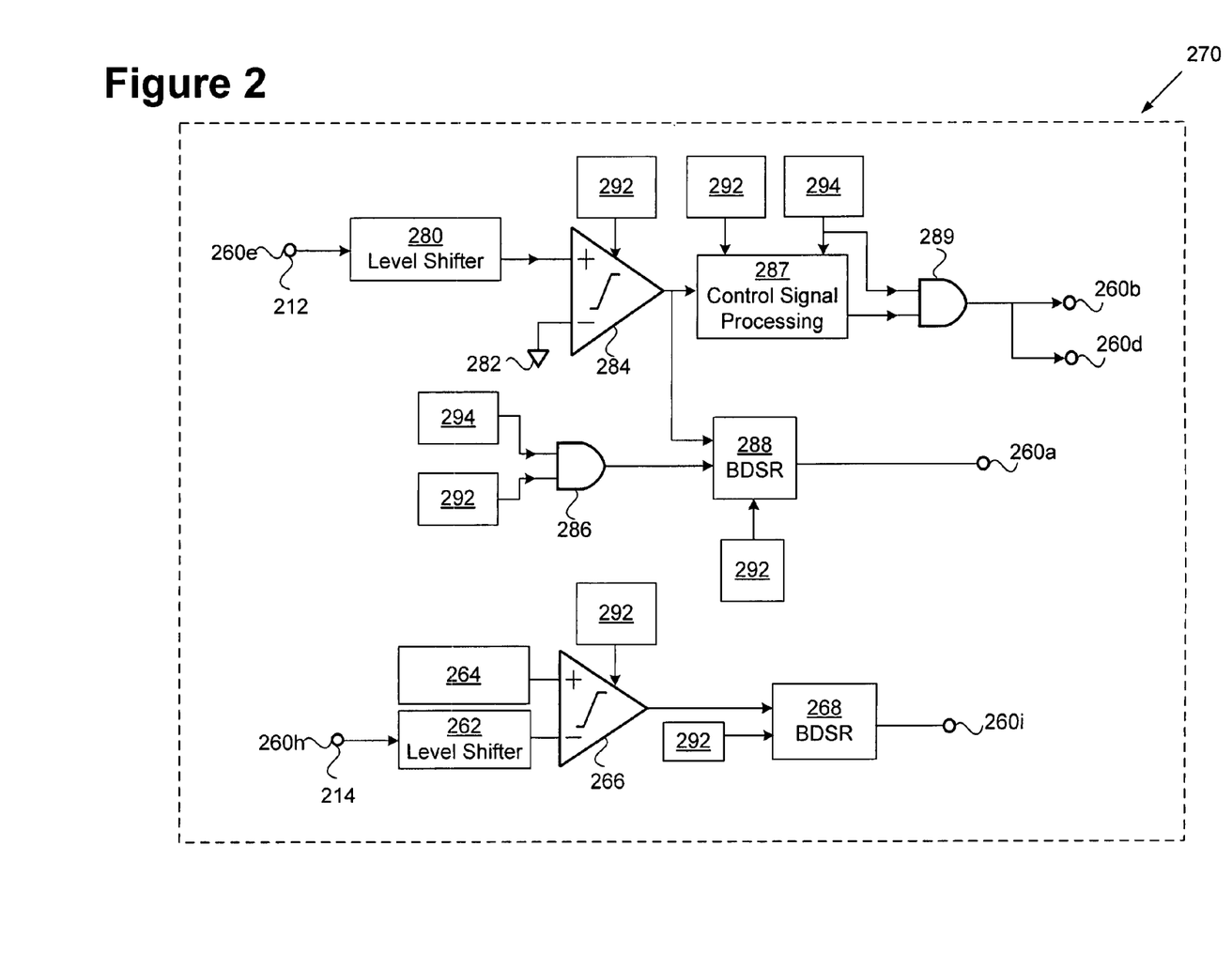
FIG. 2 shows a block diagram of a regulation and transition circuit used in connection with a multi-mode charge pump, according to one embodiment of the present invention.

According to the embodiment shown in FIG. 1, regulation circuit 160 may include a smooth transition circuit 170 to transition charge pump stage 110 between the full-voltage mode and the half-voltage mode by activating either the full-voltage circuit or the half-voltage circuit within charge pump stage 110. Turning to FIG. 2, FIG. 2 shows such a regulation and transition circuit in greater detail. Regulation and transition circuit 270 can be used to regulate output voltages with dynamic turn-on resistance control both at full-voltage mode and half-voltage mode. Regulation and transition circuit 270 can also be used to smoothly transition from a full-voltage mode to a half-voltage mode. Regulation and transition circuit 270 may monitor a negative voltage at negative terminal 260e and a positive voltage at positive terminal 260h. Regulation and transition circuit 270 may supply dynamic turn-on resistance control signals 260a and 260i, as well as other control signals such as 260b and 260d.

As shown in FIG. 2, the positive voltage at positive terminal 214 of regulation and transition circuit 270 may be input into level shifter 262. Comparator 266 may compare positive reference voltage 264 (which may be a full positive voltage, a half positive voltage, or some fraction of a full positive voltage or a half positive voltage, for example) and the level shifted voltage from level shifter 262. Bi-directional shift register (BDSR) 268 may count the comparison as a series of bits. Each bit number increase or decrease in the series of bits may correspond to a comparison that has occurred over one increased rate clock cycle from fast clock 292. Regulation and transition circuit 270 may then output a series of dynamic turn-on resistance control signals from terminal 260i.

Similarly, the negative voltage at negative terminal 212 of regulation and transition circuit 270 may be input into level shifter 280. Comparator 284 may compare a ground reference voltage from ground terminal 282 and the level shifted voltage from level shifter 280. BDSR 288 may count the comparison as a series of bits. Each bit number increase or decrease in the series of bits may correspond to a comparison that has occurred over one increased rate clock cycle from fast clock 292. In one embodiment, AND gate 286 may connect fast clock 292 and system clock 294 to BDSR 288. Regulation and transition circuit 270 may then output the series of dynamic turn-on resistance control signals from terminal 260a.

The increased clock rate of fast clock 292 may be substantially equal to an integer multiple of the rate of system clock 294, for example. The number of bits in the series of bits in BDSR 268 may correspond to the integer multiple of the increased clock rate from fast clock 292 over the system clock rate from system clock 294.

Regulation and transition circuit 270 may also include control signal processing block 287, which may be connected to both system clock 294 and fast clock 292. The output of control signal processing block 287 may operate at the system clock rate of system clock 294. AND gate 289 may further output a reprocessed signal from both control signal processing block 287 and system clock 294 to terminals 260b and 260d.

The exemplary embodiments of multi-mode charge pump 100 in FIG. 1 including regulation and transition circuit 270 in FIG. 2 will now be further described by reference to flowchart 300 in FIG. 3, flowchart 420 in FIG. 4A, flowchart 460 in FIG. 4B, and flowchart 540 in FIG. 5. Flowchart 300 presents an example method for operating a power efficient multi-mode charge pump, while flowchart 420 in FIG. 4A, 460 in FIG. 4B, and 540 in FIG. 5 describes the steps, according to one embodiment of the present invention, of a method for use by a power-efficient multi-mode charge pump with dynamic turn-on resistance control and smooth mode transition.

It is noted that certain details and features that are apparent to a person of ordinary skill in the art have been left out of flowcharts 300, 420, 460, and 540. For example, a step may comprise one or more substeps as known in the art. Moreover, while steps 320 through 360 in flowchart 300, steps 422 and 424 in flowchart 420, steps 462 through 466 in flowchart 460, and steps 542 through 548 in flowchart 540 are sufficient to describe one embodiment of the present invention, other embodiments of the invention may utilize steps different from those shown in flowcharts 300, 420, 460, and 540.

Figure 3:
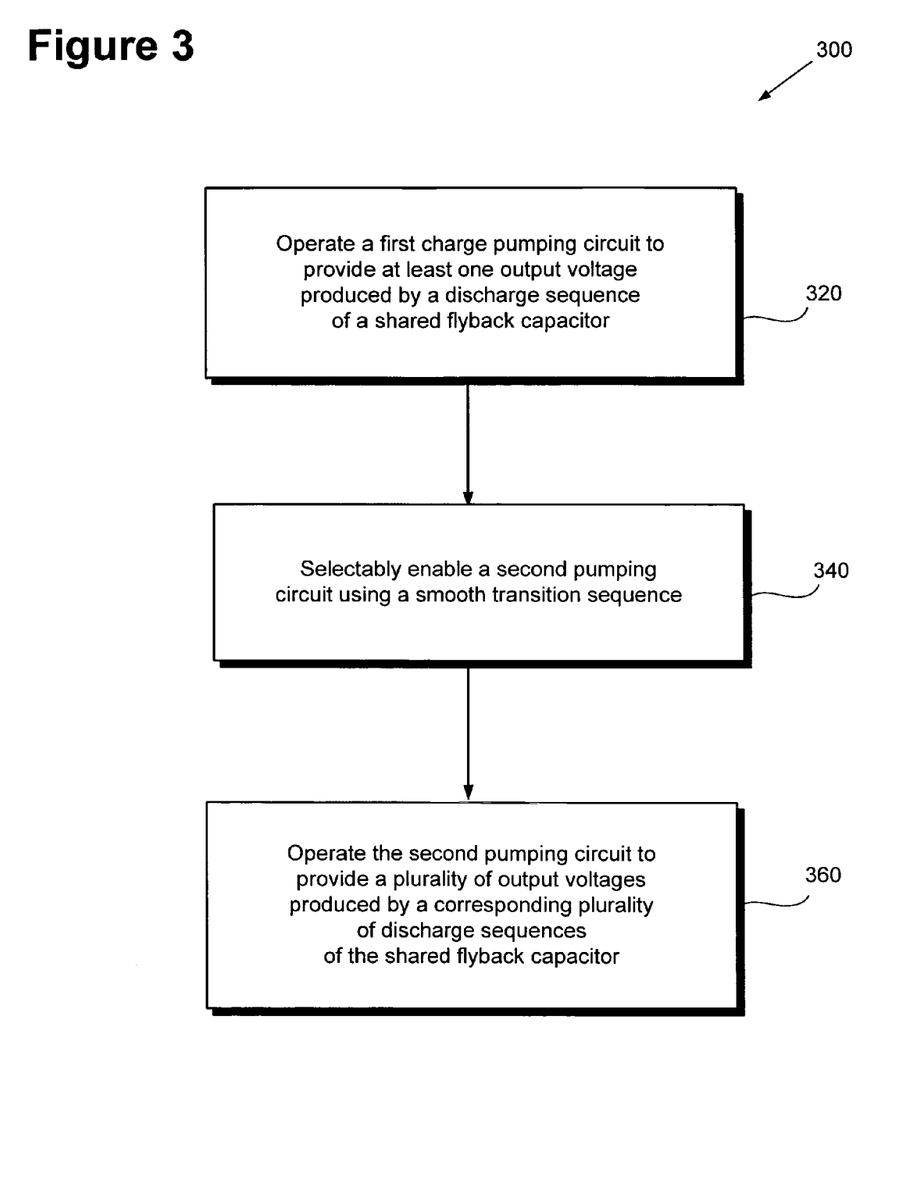
FIG. 3 is a flowchart presenting a method for operating a power efficient multi-mode charge pump, according to one embodiment of the present invention.

Referring first to FIG. 3, flowchart 300 presents a method for operating a power efficient multi-mode charge pump, according to one embodiment of the present invention. Step 320 of flowchart 300 comprises operating a first charge pumping circuit to provide at least one output voltage produced by a discharge sequence of a shared flyback capacitor. Turning to FIG. 1, a first charge pumping circuit may comprise the full-voltage circuit within charge pump stage 110 that is operational during the full-voltage mode. To begin operation of the full-voltage circuit, regulation circuit 160 may enable switches 120, 128, and 132, as well as switching groups 122 and 126. Regulation circuit 160 may also disable switches 124 and 130. Moreover, regulation circuit 160 may provide negative output voltage 112. Negative output voltage 112 may have a magnitude substantially equal to the magnitude of voltage source 150, and may be produced by a two-phase discharge sequence of shared flyback capacitor 140.

Figure 4A:
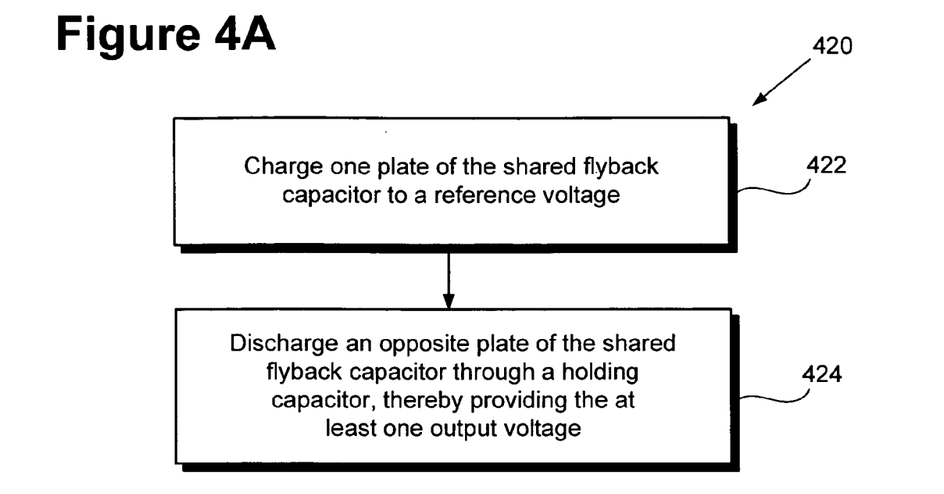
FIG. 4A is a flowchart presenting an exemplary two-phase discharge sequence to for a power efficient multi-mode charge pump, according to one embodiment of the present invention.

Flowchart 420 in FIG. 4A illustrates such an exemplary two-phase discharge sequence. Turning to step 422 of flowchart 420, step 422 of flowchart 420 comprises charging one plate of the shared flyback capacitor to a reference voltage. Referring again to FIG. 1, regulation circuit 160 may supply control signals to close switches 120 and 128, and open switching group 126 and switch 132. Consequently, regulation circuit 160 may charge first plate 140a of shared flyback capacitor 140 to a reference voltage that is substantially equal to the magnitude of voltage source 150.

Moving to step 424 of flowchart 420 in FIG. 4A, step 424 comprises discharging an opposite plate of the shared flyback capacitor through a holding capacitor, providing the at least one output voltage. Returning to FIG. 1, regulation circuit 160 may supply control signals to close switching group 126 and switch 132, and to open switches 120 and 128. Moreover, regulation circuit 160 may provide dynamic turn-on resistance control signals to control the number of switches within switching group 126 to be selectively turned on. As a result, second plate 140b of shared holding capacitor 140 may have a negative potential with a magnitude substantially equal to the voltage at voltage source 150. Shared flyback capacitor 140 may then discharge through negative holding capacitor 142, providing negative output voltage 112, with a magnitude substantially equal to the magnitude of the voltage of voltage source 150. Regulation circuit 160 may also close switching group 122, while switches 124 and 130 are disabled, to provide positive output voltage 114. That is to say, regulation circuit 160 may also provide dynamic turn-on resistance control signals to control the number of switches in switching group 122 to be selectively turned on. In addition to operating in a full-voltage mode, embodiments of the present invention may include a novel transition sequence to the half-voltage mode.

Returning to flowchart 300, step 340 of flowchart 300 comprises selectably enabling a second pumping circuit using a smooth transition sequence. Returning to FIG. 1, a second charge pumping circuit may comprise the half-voltage circuit within charge pump stage 110 operational during the half-voltage mode. In the half-voltage mode, switching group 122 may be disabled. Switches 120, 124, 128, 130, and 132; and switching group 126 may be enabled. Regulation circuit 160 may selectably enable either the full-voltage circuit or the half-voltage circuit using a smooth transition sequence.

Figure 5:
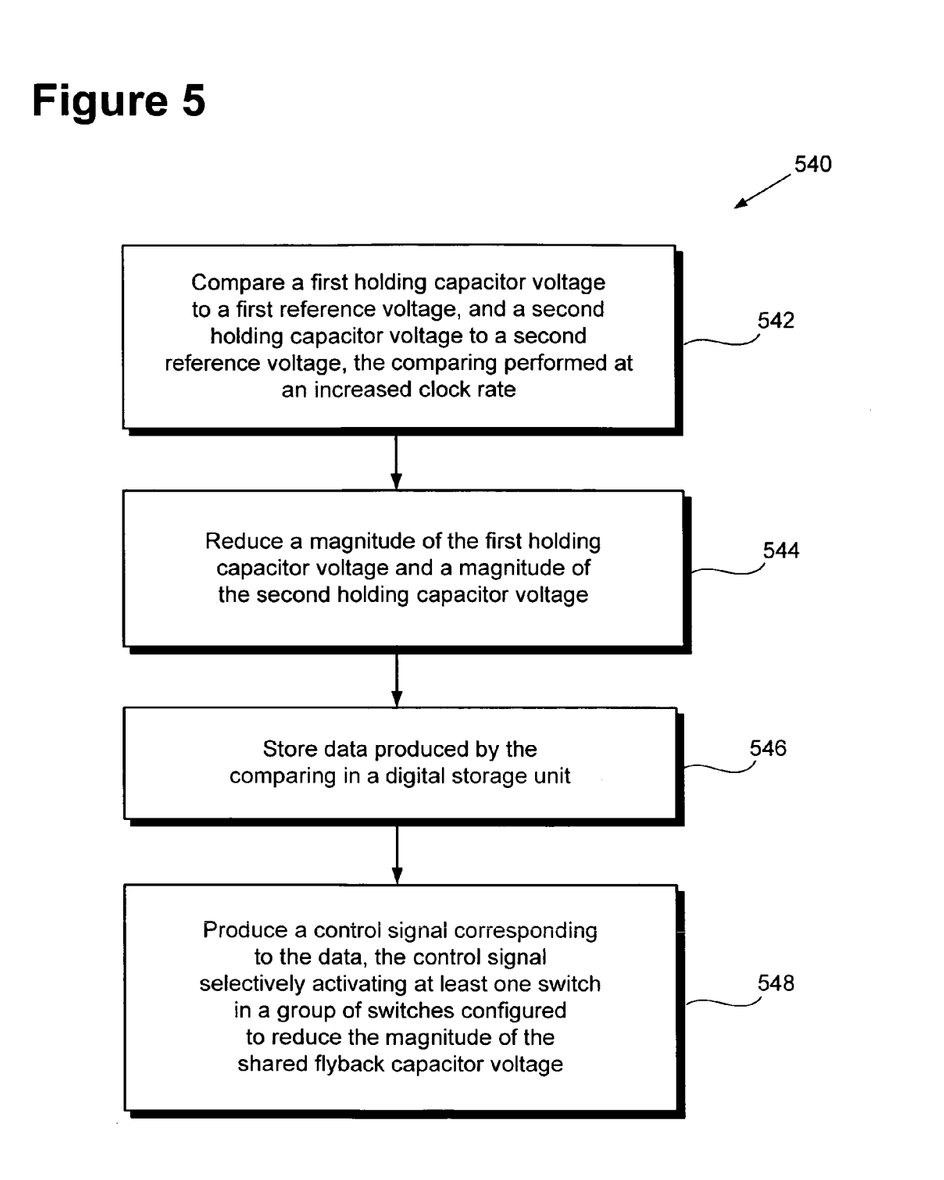
FIG. 5 is a flowchart presenting an exemplary smooth transition sequence for use by a power efficient multi-mode charge pump, according to one embodiment of the present invention.

Flowchart 540 in FIG. 5 illustrates an exemplary smooth transition sequence for a transition from full-voltage mode to half-voltage mode. Turning to step 542 of flowchart 540 and referring to FIGS. 1 and 2, step 542 comprises comparing a first holding capacitor voltage to a first reference voltage at half-voltage mode and a second holding capacitor voltage to a second reference voltage at half-voltage mode, the comparing performed at an increased clock rate. In the embodiment illustrated in FIG. 1, regulation circuit 160 may use transition circuit 170 to compare a negative reference voltage at half-voltage mode to negative output voltage 112, and a positive reference voltage at half-voltage mode to positive output voltage 114. In another embodiment, regulation circuit 160 may compare any node voltage, such as an output voltage, of charge pump stage 110 to a reference voltage. This comparison may occur at an increased clock rate.

Turning to FIG. 2, level shifter 280 may level shift the negative voltage received at input 260e by a value substantially equal to one half of the magnitude of the voltage supply, namely to a value closer to the ground reference voltage. Operating at an increased clock rate from fast clock 292, comparator 284 may compare the level shifted voltage to the ground reference voltage at ground terminal 282. Similarly, level shifter 262 may level shift the positive voltage received at input 260h. Operating at the increased clock rate from fast clock 292, comparator 266 may compare the level shifted positive voltage to positive reference voltage 264.

Moving to step 544 in FIG. 5, step 544 of flowchart 540 comprises reducing a magnitude of the first holding capacitor voltage and the second holding capacitor voltage. Referring again to FIG. 1, regulation circuit 160 may open switching group 122 and switch 132. By opening switching group 122, regulation circuit 160 may disconnect positive holding capacitor 144 from voltage source 150. By opening switch 132, regulation circuit 160 may disconnect negative holding capacitor 142 from voltage source 150. Thus, regulation circuit 160 may reduce the voltages across negative holding capacitor 142 and positive holding capacitor 144.

Steps 546 and 548 of flowchart 540 in FIG. 5 comprise exemplary steps to reduce a magnitude of the shared flyback capacitor voltage until the shared flyback capacitor voltage substantially equals either the first reference voltage or the second reference voltage. Step 546 comprises storing data produced by the comparing in a digital storage unit. Referring to FIG. 1, regulation circuit 160 may store the data from the negative and positive comparisons in a digital storage unit of transition circuit 170 (digital storage unit not shown in FIG. 1). For example, turning to FIG. 2, BDSR 268 may count a series of bits that correspond to the positive comparison from comparator 266. Similarly, BDSR 288 may count a series of bits that correspond to the negative comparison from comparator 284.

The multi-mode charge pump of the present invention may also employ dynamic turn-on resistance control during a transition from full-voltage mode to half-voltage mode. Turning to step 548 of flowchart 540 in FIG. 5 and taking reference to FIGS. 1 and 2, step 548 of flowchart 540 comprises producing a control signal corresponding to the data, the control signal selectively activating at least one switch in a group of switches configured to reduce the magnitude of the shared flyback capacitor voltage. In the embodiment shown in FIGS. 1 and 2, regulation circuit 160 may supply a control signal to selectively activate at least one switch in switching group 126. In the control signal, a bit having a logical HIGH may indicate that the magnitude of negative output voltage 112 exceeds the negative reference voltage, set as one half of the magnitude of the voltage supply in the half-voltage mode, for a given increased clock rate cycle. The bit having the logical HIGH value may selectively activate a corresponding switch in switching group 126. Turning to FIG. 2, BDSR 288 may provide the control signal. In another embodiment, regulation circuit 160 may selectively activate at least one switch in any group of switches that are configured to regulate the charge/discharge of a capacitor within charge pump stage 110.

Returning to FIG. 1, regulation circuit 160 may enable additional switches in switching group 126 until all switches in the group are enabled. By sequentially enabling a series of comparatively small switches, such as the switches in switching group 126, multi-mode charge pump 100 may regulate a charge/discharge of a capacitor, such as shared flyback capacitor 140. A small turn-on resistance characterizes the smooth transition to the half-voltage mode. Thus, unlike a conventional charge pump, multi-mode charge pump 100 may regulate a charge/discharge of shared flyback capacitor 140 at low load currents without large output voltage variations. Moreover, unlike a conventional charge pump, multi-mode charge pump 100 may regulate the charge/discharge of shared flyback capacitor 140 at high load currents while maintaining a stable output voltage.

After regulation circuit 160 has enabled switching group 126, regulation circuit 160 may also close switch 132. As shared flyback capacitor 140 and negative holding capacitor 142 are connected in parallel, the magnitude of negative output voltage 112 may become less than the magnitude of the voltage provided be voltage source 150. The voltage across shared flyback capacitor 140 may also fall to the point of being unable to supply the load current of the charge pump. After activation of switches in switching group 126, regulation circuit 160 may fully transition into the half-voltage mode by disabling switching group 122, and enabling switches 130 and 124.

The operation of the charge pumping circuit in the second voltage mode, e.g., half-voltage mode, will now be described. Returning to flowchart 300 in FIG. 3, and taking reference to FIG. 1, step 360 of flowchart 300 comprises operating the second pumping circuit to provide a plurality of output voltages produced by a corresponding plurality of discharge sequences of the shared flyback capacitor. Turning to FIG. 1, a second charge pumping circuit may comprise the half-voltage circuit within charge pump stage 110 that supports the half-voltage mode. In the half-voltage mode, switching group 122 may be disabled. Switches 120, 124, 128, 130, and 132; and switching group 126 may be enabled.

Regulation circuit 160 may employ a three-phase regulation scheme to operate the half-voltage circuit to provide negative output voltage 112 and positive output voltage 114, both produced by a corresponding plurality of discharge sequences of shared flyback capacitor 140.

Figure 4B:
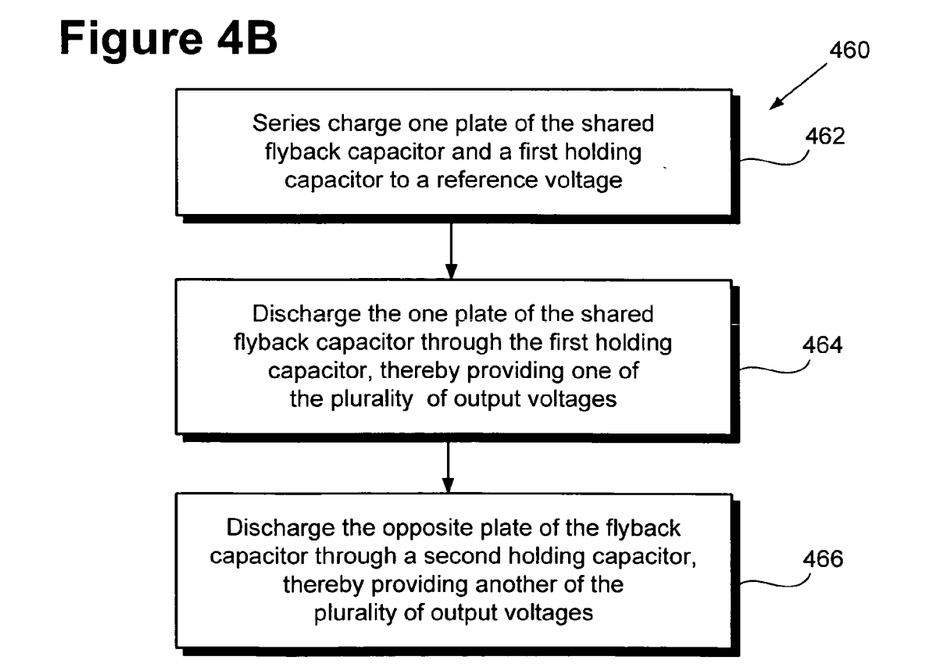
FIG. 4B is a flowchart presenting an exemplary three-phase discharge sequence for a power efficient multi-mode charge pump, according to one embodiment of the present invention.

Flowchart 460 in FIG. 4B illustrates an exemplary three-phase plurality of discharge sequences. Turning to step 462 of flowchart 460, step 462 comprises series charging one plate of the shared flyback capacitor and a first holding capacitor to a reference voltage. Referring to FIG. 1, regulation circuit 160 may supply control signals to close switches 120 and 130, and open all other switches. Consequently, first plate 140a of shared flyback capacitor 140 may be charged to the value of voltage source 150, and second plate 140b of shared flyback capacitor 140 may have a potential approximately equal to one half of the voltage of voltage source 150. The corresponding voltage across positive holding capacitor 144 may also approximately equal to one half of the voltage of voltage source 150.

Turning to step 464 of flowchart 460 in FIG. 4B, step 464 comprises discharging the one plate of the shared flyback capacitor through the first holding capacitor thereby providing one of the plurality of output voltages. Returning to FIG. 1, regulation circuit 160 may open switches 120 and 130, and may close switches 124 and 128. Due to flyback capacitor 140 and positive holding capacitor 144 being coupled in parallel, the magnitude of positive output voltage 114 may be substantially equal to one half of the magnitude of voltage source 150. First plate 140 of shared flyback capacitor 140 may be discharged through positive holding capacitor 144. Positive output voltage 114 may be provided.

Turning to step 466 of flowchart 460 in FIG. 4B and referring to FIG. 1, step 466 comprises discharging an opposite plate of the flyback capacitor through a second holding capacitor, thereby providing another of the plurality of output voltages. Returning to FIG. 1, regulation circuit 160 may open switches 124 and 128, and close both switch 132 and switching group 126. The charge stored in shared flyback capacitor 140 will cause second plate 140b to have a potential approximately equal to one half of the magnitude of the voltage of voltage source 150. Second plate 140b of shared flyback capacitor 140 may be discharged through negative holding capacitor 142. Thus, negative output voltage 112 may also be equal to one half of the negative of the voltage of voltage source 150. Negative output voltage 112 may be provided.

The power efficient multi-mode charge pump presents reliable and stable capacitor charge and discharge sequences. When reducing charge across the shared flyback capacitor, substantially no charge is leaked into the power supply. In addition, the charge and discharge sequences of the shared flyback capacitor do not cause output voltage variations and are not easily affected by voltage source fluctuations.

The multi-mode charge pump also provides a number of specific voltage levels that are readily accessible by circuits such as Class-G amplifiers. A Class-G amplifier can use a multi-mode charge pump to access at least a positive full output voltage, a negative full output voltage, a positive half output voltage, and a negative half output voltage. The multi-mode charge pump requires only one flyback capacitor and no inductors. The multi-mode charge pump is readily adaptable to mobile communications devices drawing power from a battery.

From the above description, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A power-efficient multi-mode charge pump comprising:
a first pumping circuit configured to provide at least one output voltage produced by a discharge sequence of a shared flyback capacitor;
a second pumping circuit configured to provide a plurality of output voltages produced by a corresponding plurality of discharge sequences of said shared flyback capacitor; and
a regulation circuit configured to:
provide dynamic turn-on resistance control signals during a smooth transition sequence from said at least one output voltage to one of said plurality of output voltages, compare, at an increased clock rate, a first holding capacitor voltage to a first reference voltage, and a second holding capacitor voltage to a second reference voltage, and reduce a magnitude of a shared flyback capacitor voltage until said shared flyback capacitor voltage substantially equals one of said first reference voltage and said second reference voltage, wherein said increased clock rate is substantially equal to an integer multiple of a system clock rate and said control signal includes a number of bits, said number of bits being substantially equal to said integer multiple of said system clock rate.

2. The power-efficient multi-mode charge pump of claim 1, wherein the first pumping circuit is further configured to:
charge one plate of said shared flyback capacitor to a third reference voltage; and
discharge an opposite plate of said shared flyback capacitor through a holding capacitor, to provide said at least one output voltage.

3. The power-efficient multi-mode charge pump of claim 1, wherein the second pumping circuit is further configured to:
series charge one plate of said shared flyback capacitor and a holding capacitor to a third reference voltage; and
discharge an opposite plate of said shared flyback capacitor through said holding capacitor, to provide one of said plurality of output voltages.

4. The power-efficient multi-mode charge pump of claim 1, wherein the second pumping circuit is further configured to:
series charge one plate of said shared flyback capacitor and a first holding capacitor to a third reference voltage;
discharge said one plate of said shared flyback capacitor through said first holding capacitor, to provide one of said plurality of output voltages; and
discharge said opposite plate of said shared flyback capacitor through a second holding capacitor to provide another of said plurality of output voltages.

5. The power-efficient multi-mode charge pump of claim 1, wherein said regulation circuit is further configured to selectably enable said first pumping circuit or said second pumping circuit using said smooth transition sequence.

6. The power-efficient multi-mode charge pump of claim 5, wherein said regulation circuit is further configured to:
reduce a magnitude of said first holding capacitor voltage and a magnitude of said second holding capacitor voltage.

7. The power-efficient multi-mode charge pump of claim 6, wherein the regulation circuit is further configured to:
store data produced by said comparing in a digital storage unit; and
produce a control signal corresponding to said data, said control signal selectively activating at least one switch in a group of switches configured to reduce said magnitude of said shared flyback capacitor voltage.

8. The power-efficient multi-mode charge pump of claim 7, wherein said digital storage unit comprises a bi-directional shift register.

9. The power-efficient multi-mode charge pump of claim 1, wherein said at least one output voltage includes a full supply voltage, and said plurality of output voltages includes a positive half supply voltage and a negative half supply voltage.

10. A method for use by a power-efficient multi-mode charge pump comprising:
operating a first pumping circuit to provide at least one output voltage produced by a discharge sequence of a shared flyback capacitor;
selectably enabling a second pumping circuit using a smooth transition sequence; and
operating said second pumping circuit to provide a plurality of output voltages produced by a corresponding plurality of discharge sequences of said shared flyback capacitor, wherein a regulation circuit provides dynamic turn-on resistance control signals during said smooth transition sequence from said at least one output voltage to one of said plurality of output voltages, said smooth transition sequence including:
comparing, at an increased clock rate, a first holding capacitor voltage to a first reference voltage, and a second holding capacitor voltage to a second reference voltage, and
reducing a magnitude of a shared flyback capacitor voltage until said shared flyback capacitor voltage substantially equals one of said first reference voltage and said second reference voltage, said increased clock rate being substantially equal to an integer multiple of a system clock rate and said control signal comprises a number of bits, said number of bits being substantially equal to said integer multiple of said system clock rate.

11. The method of claim 10, wherein said discharge sequence further includes:
charging one plate of said shared flyback capacitor to a third reference voltage; and
discharging an opposite plate of said shared flyback capacitor through a holding capacitor, to provide said at least one output voltage.

12. The method of claim 10, wherein said corresponding plurality of discharge sequences further includes:
series charging one plate of said shared flyback capacitor and a holding capacitor to a third reference voltage;
discharging said one plate of said shared flyback capacitor through said holding capacitor, thereby providing one of said plurality of output voltages; and
discharging said opposite plate of said shared flyback capacitor through a second holding capacitor, to provide another of said plurality of output voltages.

13. The method of claim 10, wherein said smooth transition sequence further includes:
reducing a magnitude of said first holding capacitor voltage and a magnitude of said second holding capacitor voltage.

14. The method of claim 13, wherein reducing said magnitude of said shared flyback capacitor voltage further includes:
storing data produced by said comparing in a digital storage unit; and
producing said dynamic turn-on resistance control signals corresponding to said data, said dynamic turn-on resistance control signals selectively activating at least one switch in a group of switches configured to reduce said magnitude of said shared flyback capacitor voltage.

15. A method for dynamically regulating a charge/discharge of a flyback capacitor in a charge pump comprising:
level shifting an output voltage of said charge pump to provide a level shifted output voltage having a higher voltage than said output voltage of said charge pump;
comparing, at an increased clock rate, said level shifted output voltage to a reference voltage;
storing data produced by said comparing in a digital storage unit; and
producing a control signal corresponding to said data, said control signal selectively activating at least one switch in a group of switches configured to regulate said charge/ discharge of said flyback capacitor, wherein said increased clock rate is substantially equal to an integer multiple of a system clock rate and said control signal comprises a number of bits, and said number of bits is substantially equal to said integer multiple of said system clock rate.

16. The method of claim 15, wherein said digital storage unit comprises a bi-directional shift register.

17. The power-efficient multi-mode charge pump of claim 8, further comprising:
a logic-AND circuit configured to perform a logic-AND of a system clock and a fast clock, an output of the logic-AND circuit driving the bi-directional shift register.

18. The method of claim 16, wherein the bi-directional shift register is driven by an input signal generated by performing a logic-AND of a system clock and a fast clock.

* * * * *